United States Patent [19]

Ikeya

[11] Patent Number: 5,629,829

[45] Date of Patent: May 13, 1997

[54] ELECTROLYTIC SOLUTION FOR ELECTROLYTIC CAPACITOR AND ELECTROLYTIC CAPACITOR

[75] Inventor: Hirotoshi Ikeya, Yokosuka, Japan

[73] Assignee: Kabushiki Kaisha Toshiba, Kawasaki, Japan

[21] Appl. No.: 526,097

[22] Filed: Sep. 11, 1995

[30] Foreign Application Priority Data

Sep. 14, 1994 [JP] Japan .................. 6-220641
Sep. 14, 1994 [JP] Japan .................. 6-220642

[51] Int. Cl.$^6$ .................. H01G 9/02
[52] U.S. Cl. .......... 361/505; 361/527; 361/327; 361/504; 252/62.2
[58] Field of Search .......... 252/62.2; 361/433, 361/525, 527, 504, 505, 503, 327

[56] References Cited

U.S. PATENT DOCUMENTS 4,786,429 11/1988 Mori et al. .................. 252/62.2
5,055,974 10/1991 Washio et al. .................. 361/527
5,120,404 6/1992 Okabayashi et al. .................. 205/139

FOREIGN PATENT DOCUMENTS 63-13321 1/1988 Japan .
2-63110 3/1990 Japan .
5-144674 6/1993 Japan .

*Primary Examiner*—Leo P. Picard
*Assistant Examiner*—Phuong T. Vu
*Attorney, Agent, or Firm*—Oblon, Spivak, McClelland, Maier & Neustadt, P.C.

[57] ABSTRACT

There is proposed an electrolytic solution having a low specific resistance, a high sparking voltage and a stable sparking property. This electrolytic solution contains a quaternary ammonium salt of cyanic acid, at least one phosphorus compound selected from an organic phosphorus acid compound, phosphoric acid and salts thereof, water and an organic solvent.

34 Claims, 2 Drawing Sheets

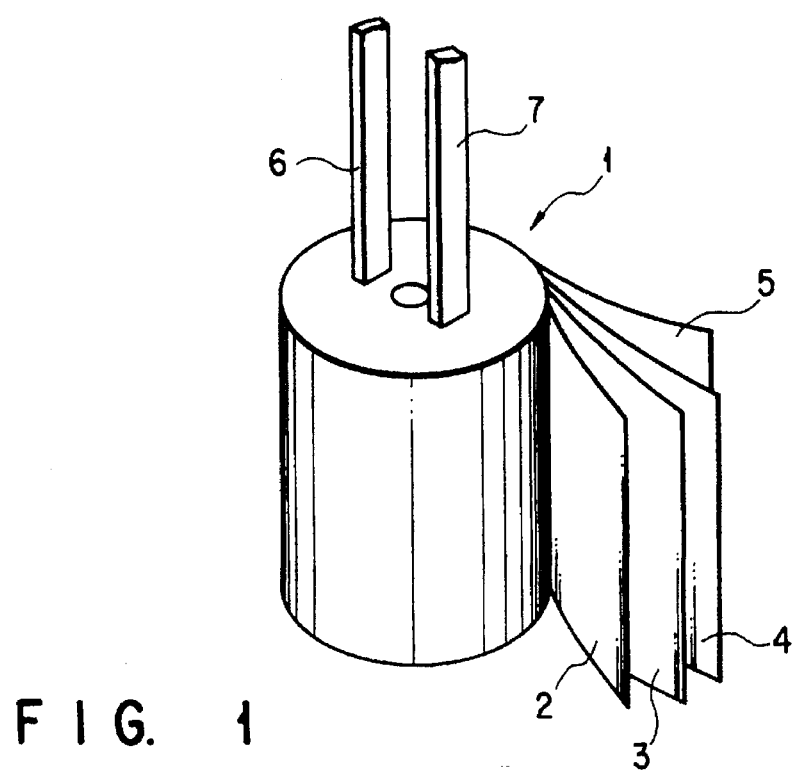
F I G. 1
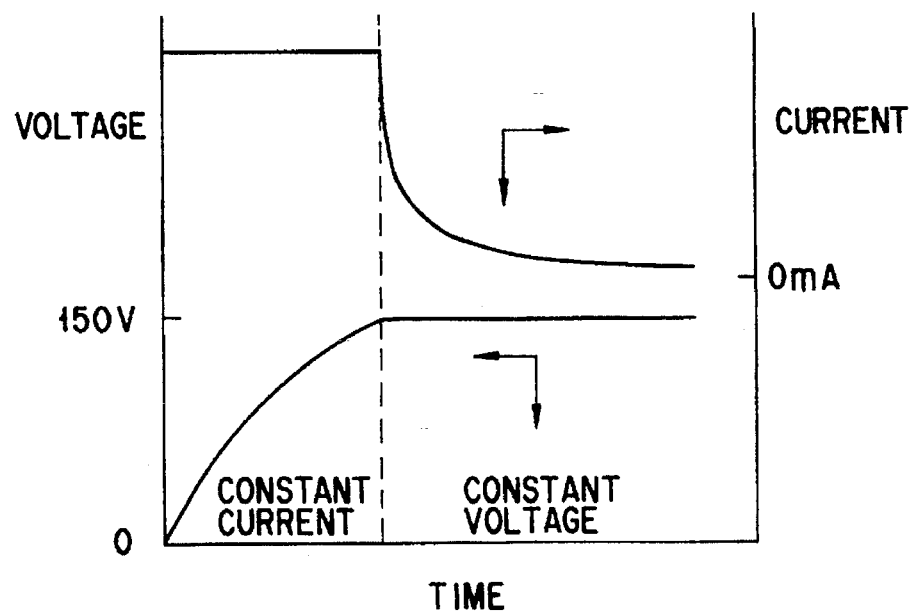
F I G. 2

ELECTROLYTIC SOLUTION FOR ELECTROLYTIC CAPACITOR AND ELECTROLYTIC CAPACITOR

BACKGROUND OF THE INVENTION

1. Field of the Invention

This invention relates to an electrolytic solution for electrolytic capacitor and an electrolytic capacitor.

2. Description of the Related Art

An electrolytic capacitor is generally manufactured as follows. Namely, an anode consisting of aluminum foil strip having on its surface an oxide film formed by anodic oxidation is superimposed with a separator sheet, a cathode plate made of aluminum foil strip and another separator paper sheet in the mentioned order thereby obtaining a laminate, which is then rolled thereby forming a rolled body. These separators are impregnated with an electrolytic solution to form a cathode, thereby accomplishing an electrolytic capacitor. The electrolytic solution functions through its inherent anodic oxidative effect to restore any defective portion of oxide film on the surface of the anode during the application of voltage between the anode and the cathode. It is required for the electrolytic solution to be low in specific resistance so as to prevent the electrolytic solution per se from excessively acting as a resistor. It is further required for the electrolytic solution to have a capability to form a high quality oxide film which is high in sparking voltage, i.e., high in withstand voltage in the occasion of restoring the defective portion of oxide film. Accordingly, if an oxide film which is low in sparking voltage is formed in the restoration of oxide film, usable voltage of a capacitor is limited. If this restored portion of oxide film is destroyed by the application of a voltage higher than this limited voltage, the capacitor becomes an unusable.

There are known various compositions of electrolytic solution for an electrolytic capacitor. For example, Jpn. Pat. Appln. KOKAI Publication No. 63-13321 discloses an electrolytic solution comprising a quaternary ammonium salt of cyanic acid dissolved in an organic solvent. This electrolytic solution, which comprises a quaternary ammonium salt of cyanic acid, is characterized as being low in specific resistance.

However, this electrolytic solution for an electrolytic capacitor is defective in that the sparking voltage thereof varies extensively due to the fluctuation of the content of water. The fluctuation of water content in the electrolytic solution may be caused by the water oozed out of the separator paper sheet during the operation of impregnating an electrolytic solution into the separator paper sheet wound together with an aluminum foil. Consequently, even if the water content in the electrolytic solution is adjusted before impregnation into the separator paper sheet, an accurate controlling of water content in the electrolytic solution after the assembling of the electrolytic capacitor becomes very difficult. This non-uniformity of sparking voltage resulting from the fluctuation of water content now causes a non-uniformity in characteristics of the electrolytic capacitor impregnated with the electrolytic solution, thereby badly affecting the reliability of a product.

Jpn. Pat. Appln. KOKAI Publication No. 2-63110 discloses an electrolytic solution for an electrolytic capacitor comprising a quaternary ammonium salt of aliphatic oxyacid dissolved in an organic solvent. This electrolytic solution comprising a quaternary ammonium salt of oxyacid is characterized as being low in specific resistance.

However, this electrolytic solution for an electrolytic capacitor is defective in that the sparking voltage thereof is low and unstable, the generation of sparking being concentrated at the interface between the electrolytic solution and air. Consequently, if this electrolytic solution for an electrolytic capacitor comprising a quaternary ammonium salt of oxyacid is to be served in practical use, the sparking voltage thereof has to be sufficiently raised and at the same time, stabilized by inhibiting the sparking from generating between the electrolytic solution and air.

SUMMARY OF THE INVENTION

Accordingly, an object of the present invention is to provide an electrolytic solution for an electrolytic capacitor which is low in specific resistance, high in sparking voltage and stable in sparking property.

Another object of this invention is to provide an electrolytic capacitor of high performance and high reliability, which is provided with an electrolytic solution having a low specific resistance, a high sparking voltage and a stable sparking property.

Still another object of this invention is to provide an electrolytic solution for an electrolytic capacitor which is capable of inhibiting a sparking generating from an interface, thereby exhibiting a high sparking voltage and a stable sparking property.

A further object of this invention is to provide an electrolytic capacitor of high performance and high reliability, which is provided with an electrolytic solution which is capable of inhibiting a sparking generating from an interface, exhibiting a high sparking voltage and a stable sparking property.

Namely, according to the present invention, there is provided an electrolytic solution for an electrolytic capacitor, which comprises a quaternary ammonium salt of cyanic acid, at least one phosphorus compound selected from an organic phosphorus acid compound, phosphoric acid and salts thereof, water and an organic solvent.

Moreover, according to the present invention, there is further provided an electrolytic capacitor which comprises an anode made of aluminum foil strip having an oxide film on at least one surface, a cathode plate and a separator paper sheet impregnated with an electrolytic solution, wherein the electrolytic solution comprises a quaternary ammonium salt of cyanic acid, at least one phosphorus compound selected from an organic phosphorus acid compound, phosphoric acid and salts thereof, water and an organic solvent.

According to the present invention, there is further provided an electrolytic solution for an electrolytic capacitor, which comprises a quaternary ammonium salt of aliphatic oxyacid, at least one compound selected from an organic phosphine compound and a surfactant, and an organic solvent.

Moreover, according to the present invention, there is further provided an electrolytic capacitor which comprises an anode made of aluminum foil strip having an oxide film on at least one surface, a cathode plate and a separator paper sheet impregnated with an electrolytic solution, wherein the electrolytic solution comprises a quaternary ammonium salt of aliphatic oxyacid, at least one compound selected from an organic phosphine compound and a surfactant, and an organic solvent.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention and, together with the general description given above and the detailed description of the preferred embodiment given below, serve to explain the principles of the invention.

FIG. 1 is a partially exploded perspective view of an electrolytic capacitor according to this invention;

FIG. 2 is a graph showing the results of measurement on voltage and current for anodic oxidation in the use of an electrolytic solution for an electrolytic capacitor according to this invention;

DETAILED DESCRIPTION OF THE PREFERRED EMBODIMENT

Figure 3:
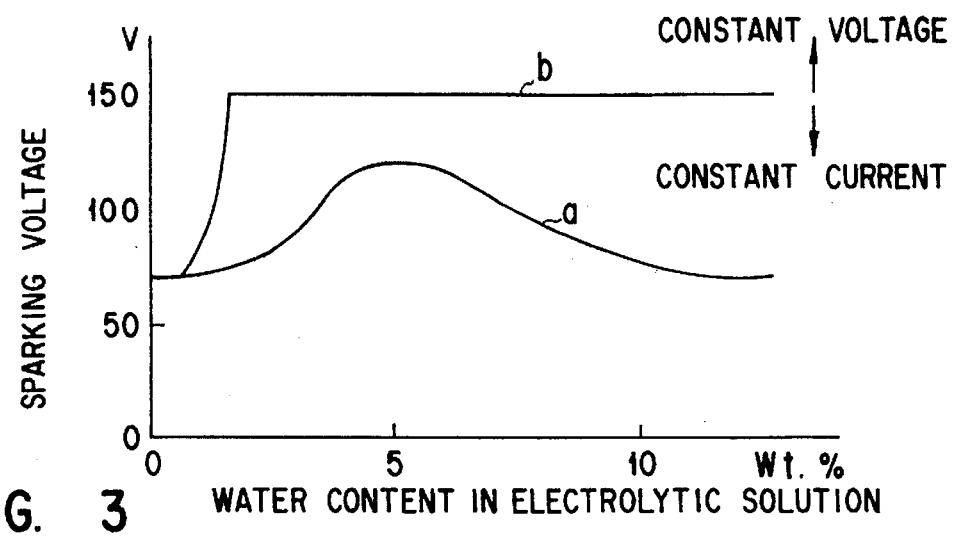
FIG. 3 is a graph showing the sparking voltage properties of an electrolytic solution for an electrolytic capacitor according to this invention.

The electrolytic solution for an electrolytic capacitor and the electrolytic capacitor according to this invention will be further explained with reference to preferred embodiments shown in FIG. 1.

FIG. 1 shows a partially exploded perspective view of an electrolytic capacitor as an example according to this invention. Referring to FIG. 1, a capacitor body 1 is composed of a laminate comprising an anode 2 made of aluminum foil strip having an oxide film on both surfaces, a separator paper sheet 3, a cathode plate 4 and another separator paper sheet 5 superimposed in the mentioned order, the laminate being rolled with the separator paper sheet 5 being disposed on outermost side. The separator paper sheets 3 and 5 are impregnated respectively with an electrolytic solution. To these anode 2 and cathode plate 4, leads 6 and 7 are respectively connected. The capacitor body 1 is housed within a bottomed cylindrical container (not shown).

This aluminum foil strip may be surface-treated by way of an electrochemical etching treatment in advance to the formation of oxide film, thereby forming a fine rugged surface. The anode consisting of an aluminum foil having a fine rugged surface is large in specific surface area so that an electrolytic capacitor of large electrostatic capacity can be realized by the use of such an anode.

The cathode plate may be made of an aluminum foil strip.

As for the electrolytic solution, the following compositions may be used.

Electrolytic Solution (I)

This electrolytic solution comprises a quaternary ammonium salt of cyanic acid, at least one phosphorus compound selected from an organic phosphorus acid compound, phosphoric acid and salts thereof, water and an organic solvent.

Examples of quaternary ammonium salt for constituting the quaternary ammonium salt of cyanic acid are tetramethyl ammonium, tetraethyl ammonium, tetrapropyl ammonium, tetrabutyl ammonium, methyltriethyl ammonium, dimethyldiethyl ammonium, trimethylethyl ammonium, methyl-tripropyl ammonium, dimethyldipropyl ammonium, trimethylpropyl ammonium, dimethyldibuty ammonium, trimethylbutyl ammonium, triethylpropyl ammonium, triethylbutyl ammonium, phenyltrimethyl ammonium, cyclohexyltrimethyl ammonium, benzyltrimethyl ammonium, N,N-dimethylpyrrolidinium, N,N-dimethylpiperazinium and N-ethylpyridinium.

These quaternary ammonium salts of cyanic acid may be added to an organic solvent until the solvent is saturated with any of these quaternary ammonium salts of cyanic acid.

The organic phosphorus acid compound useful in this invention is a compound having an organic group and at least one P—OH bond. Examples of such an organic phosphorus acid compound are phosphonic acids such as ethyl phosphonic acid and phenyl phosphonic acid; phosphinic acids such as dibutyl phosphinic acid and diphenyl phosphinic acid; phosphinous acids such as ethyl phosphinous acid and phenyl phosphinous acid; phosphate diesters such as dimethyl phosphate and dibutyl phosphate; phosphate monoesters such as methyl phosphate and butyl phosphate; phosphite diesters such as dimethyl phosphite and dibutyl phosphite; phosphite monoesters such as methyl phosphite and butyl phosphite; hypophosphite esters such as butyl hypophosphite; phosphonate esters such as ethyl phosphonate; and phosphinate esters such as methyl phosphinate.

There is no limitation with respect to the salts of these organic phosphorus acid compounds or phosphoric acid. However, it is preferable to employ quaternary ammonium salts as exemplified above such for example as tetramethyl ammonium monobutyl phosphate, tetraethyl ammonium dimethyl phosphate and tetraethyl ammonium phenyl phosphonate.

At least one phosphorus compound selected from an organic phosphorus acid compound, phosphoric acid and salts thereof may be added to the electrolytic solution at the ratio of preferably 0.01 to 20% by weight. If the content of the phosphorus compound is less than 0.01% by weight based on the weight of the electrolytic solution, the effect of improving the sparking voltage would become negligible. On the other hand, if the content of the phosphorus compound exceeds 20% by weight based on the weight of the electrolytic solution, the quaternary ammonium salt of cyanic acid can not be fully dissolved into the organic solvent so that the specific resistance of the electrolytic solution may be caused to increase. More preferable content of the phosphorus compound is 0.1 to 3.0% by weight.

The content of water in the electrolytic solution should desirably be in the range of 0.05 to 20% by weight, more preferably 0.1 to 5% by weight in view of improving the sparking voltage of the electrolytic solution through its synergistic action with at least one phosphorus compound selected from an organic phosphorus acid compound, phosphoric acid and salts thereof.

Examples of the organic solvent useful in this invention are lactonic solvents such as γ-butyrolactone, α-acetylbutyrolactone, β-butyrolactone, γ-valerolactone and δ-valerolactone; amic solvents such as N-methyl formamide, N,N-dimethyl formamide, N-ethyl formamide, N,N-diethyl formamide, N-methyl acetamide, N,N-dimethyl acetamide, N,N-dimethyl propionamide and hexamethyl phosphorylamide; carbonate solvents such as ethylene carbonate, propylene carbonate, butylene carbonate, dimethyl carbonate, diethyl carbonate, and methylethyl carbonate; nitrile solvents such as acetnitrile and propionitrile; phosphate solvents such as trimethyl phosphate; alcoholic solvents such as ethylene glycol and methyl Cellosolve; N-methylpyrrolidinone; N-methyl-2-oxazolydinone; dimethyl sulfoxide; sulforane and 1,3-dimethyl-2-imidazolydinone. These solvents may be employed singly or in combination of them.

Electrolytic solution (I) explained above is characterized in that it is low in specific resistance, high in sparking voltage and stable in sparking voltage even when the content of water is fluctuated. The stability in sparking voltage of the electrolytic solution is brought about by the synergistic action between water and at least one phosphorus compound selected from an organic phosphorus acid compound, phosphoric acid and salts thereof as explained below.

First, tetraethyl ammonium cyanate was dissolved into an organic solvent, e.g. γ-butyrolactone thereby preparing a 20 wt % solution, which was then measured of its sparking voltage. As a result, the sparking voltage was found to be 70 V.

The measurement of this sparking voltage was conducted as follows. Namely, an anode consisting of pure aluminum foil having no oxide film deposited thereon was immersed into an electrolytic solution, and a constant current was applied to the anode. During the application of the constant current to the anode, an oxide film was gradually formed on the surface of the anode to function as a resistance element, thus increasing the voltage and therefore lowering the current. In the process of applying the constant current to the anode, an oxide film was forced to destroy due to the increase of voltage. The magnitude of the voltage (withstanding voltage) at which the oxide film was caused to destroy was measured, defining this voltage as a sparking voltage. The breakdown voltage (withstanding voltage) of an oxide film formed on the surface of anode is determined by the composition of the electrolytic solution. The higher the breakdown voltage, the higher the quality of the oxide film. The measurement of the sparking voltage was carried out by using a constant current until the voltage reaches to 150 V, and after the voltage was over 150 V, by using a constant voltage.

The characteristic curve a in FIG. 3 indicates changes of sparking voltage of the solution (electrolytic solution) which were resulted by gradually adding water to the tetraethyl ammonium cyanate solution initially prepared. As seen from this characteristic curve a, the sparking voltage was increased as the content of water was increased. However, when the content of water was exceeded over about 5 wt %, the sparking voltage was decreased conversely returning to the initial value. Thus, the electrolytic solution comprising tetraethyl ammonium cyanate dissolved into γ-butyrolactone is very unstable in sparking voltage in relative to the fluctuation of the water content.

Moreover, the value of each sparking voltage in each water content shown in the characteristic curve a in FIG. 3 represents an average value. Actually however, the measured values of sparking voltage at each water content fluctuated extensively. In particular, after the voltage increased up to the maximum, the values of voltage in each water content fluctuated extensively such that the sparking voltage at some of water content went down to 60 V, thus indicating an extensive instability of sparking voltage of the solution.

Furthermore, the absolute values of sparking voltage (70–120 V) are also rather low and undesirable in practical use.

When 0.5 wt % of a salt of an organic phosphorus acid compound such as tetraethyl ammonium monobutylphosphate was added to the 20 wt % solution of tetraethyl ammonium cyanate in γ-butyrolactone, and the resultant electrolytic solution was measured of its sparking voltage, the sparking voltage obtained was found to be 70 V, indicating that the addition of the salt of an organic phosphorus acid compound had little effect on the improvement of sparking voltage. Even when the amount of the salt of an organic phosphorus acid compound was changed to 0.1 wt % or 1 wt %, the results were almost the same as indicated above.

The characteristic curve b in FIG. 3 indicates changes of sparking voltage of the solution (electrolytic solution) of tetraethyl ammonium cyanate and a salt of an organic phosphorus acid compound such as tetraethyl aonium monobutylphosphate in γ-butyrolactone when the solution was gradually added with water. As seen from this characteristic curve b, the sparking voltage was abruptly increased as a little amount of water was added. Once the sparking voltage increased to the level of maximum, this high level of sparking voltage was maintained even if the content of water was increased. Thus, the electrolytic solution comprising a salt of an organic phosphorus acid compound such as tetraethyl ammonium monobutylphosphate in addition to tetraethyl ammonium cyanate is very stable in sparking voltage in relative to the fluctuation of the water content.

In the case of the characteristic curve b in FIG. 3, any substantial variation in sparking voltage at each water content was not recognized, thus indicating excellent stability in sparking voltage of the electrolytic solution.

As explained above, owing to a synergistic action between water and a salt of an organic phosphorus acid compound such as tetraethyl ammonium monobutylphosphate, it is possible to obtain an electrolytic solution excellent in stability of sparking voltage in relative to the fluctuation of water content. Such a synergistic action can also be obtained by other combinations between water and at least one phosphorus compound selected from the group consisting of organic phosphorus acid compounds, phosphoric acid and salts thereof (other than tetraethyl ammonium monobutylphosphate).

The synergistic effect to be derived from the combination between water and at least one phosphorus compound selected from the group consisting of organic phosphorus acid compounds, phosphoric acid and salts thereof is particularly effective only when the combination is employed in relative to a quaternary ammonium salt of cyanic acid as explained in the following Test Nos. 1 and 2.

(Test No. 1)

First, tetraethyl ammonium salt of 2,6-dihydroxybenzoic acid was employed in place of tetraethyl ammonium cyanate and dissolved into γ-butyrolactone thereby preparing a 20 wt % solution, which was then measured of its sparking voltage. As a result, the sparking voltage was found to be 30 V.

Figure 4:
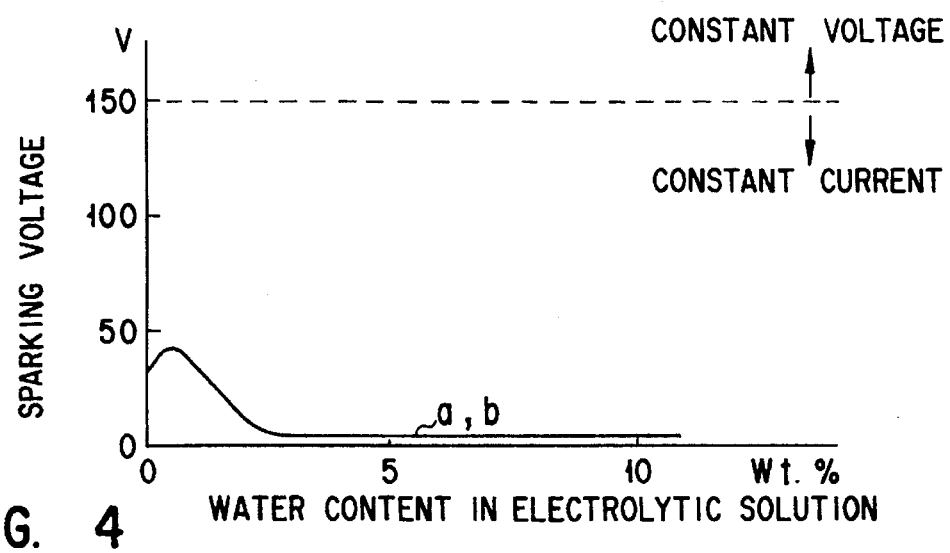
FIG. 4 is a graph showing the sparking voltage properties of an electrolytic solution comprising tetraethylammonium salt of 2,6-dihydroxybenzoic acid.

The characteristic curve a in FIG. 4 indicates changes of sparking voltage of the solution (electrolytic solution) which were resulted by gradually adding water to the solution initially prepared. As seen from this characteristic curve a, the sparking voltage was slightly increased as the content of water increased and then immediately decreased showing low sparking voltages as the content of water was further increased.

When 1 wt % of tetraethyl ammonium monobutylphosphate was added to the 20 wt % solution of tetraethyl ammonium salt of 2,6-dihydroxybenzoic acid in g-butyrolactone, and the resultant electrolytic solution was measured of its sparking voltage, the sparking voltage obtained was found to be 30 V, indicating that the addition of the salt of an organic phosphorus acid compound had little effect on the improvement of sparking voltage.

The characteristic curve b in FIG. 4 indicates changes of sparking voltage of the solution (electrolytic solution) of tetraethyl ammonium salt of 2,6-dihydroxybenzoic acid and tetraethyl ammonium monobutylphosphate in γ-butyrolactone when the solution was gradually added with water. As seen from this characteristic curve b, this electrolytic solution indicated not synergistic action between the tetraethyl ammonium monobutylphosphate and water, the magnitude of sparking voltage thereof being almost the same as that where only water was added to the quaternary ammonium salt.

Accordingly, when tetraethyl ammonium salt of 2,6-dihydroxybenzoic acid is employed as main component of an electrolytic solution, it is impossible to stabilize the sparking voltage in relative to the fluctuation of water content even if tetraethyl ammonium monobutylphosphate and water are added to this quaternary ammonium salt. (Test No. 2)

Tetraethyl ammonium salt of phthalic acid was employed in place of tetraethyl ammonium cyanate and then subjected to the same test in the same manner as in the case of tetraethyl ammonium salt of 2,6-dihydroxybenzoic acid.

Figure 5:
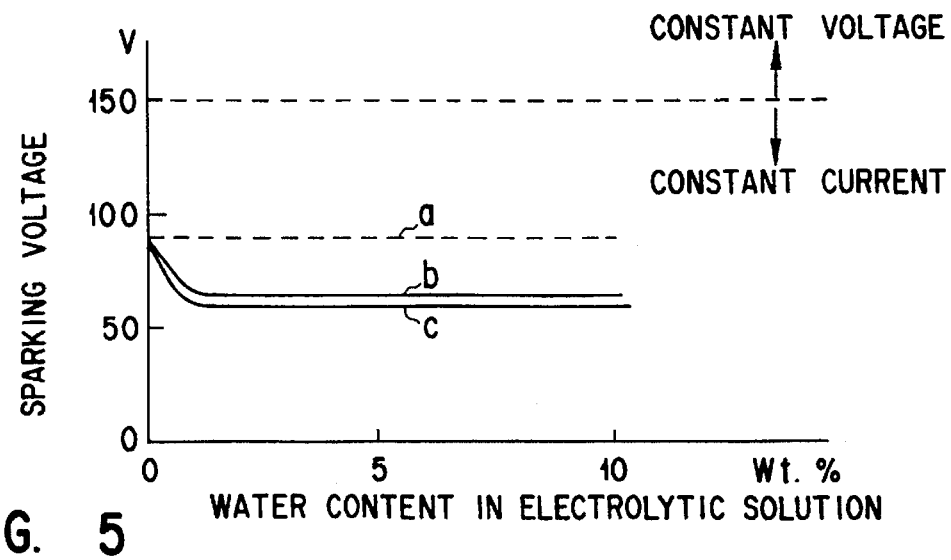
FIG. 5 is a graph showing the sparking voltage properties of an electrolytic solution comprising tetraethylammonium salt of phthalic acid.

The characteristic curve a in FIG. 5 indicates changes of sparking voltage of the solution (electrolytic solution) which were resulted by gradually adding water to a 20 wt % solution of tetraethyl ammonium salt of phthalic acid in γ-butyrolactone. As seen from this characteristic curve a, the sparking voltage was not fluctuated even if the water content was altered.

The characteristic curve b in FIG. 5 indicates changes of sparking voltage of the solution (electrolytic solution) which were resulted when a 20 wt % solution of tetraethyl ammonium salt of phthalic acid in γ-butyrolactone was added with 1 wt % of tetraethyl ammonium monobutylphosphate and at the same time gradually added with water. As seen from this characteristic curve b, the sparking voltage was lowered as the water content was increased, indicating the fluctuation of sparking voltage in relative to the content of water.

The characteristic curve c in FIG. 5 indicates changes of sparking voltage of the solution (electrolytic solution) which were resulted when a 20 wt % solution of tetraethyl amonium salt of phthalic acid in γ-butyrolactone was added with 1 wt % of monomethylphosphate and at the same time gradually added with water. As seen from this characteristic curve c, even when the kind of organic phosphorus acid compound was changed from tetraethyl ammonium monobutylphosphate to monomethylphosphate, the sparking voltage was lowered as the water content was increased as in the case of the characteristic curve b, indicating the fluctuation of sparking voltage in relative to the content of water.

It can be seen from the test that when only tetraethyl ammonium salt of phthalic acid was added to an organic solvent, there was not recognized any fluctuation in sparking voltage in relative to the water content. However, when tetraethyl ammonium monobutylphosphate or monomethylphosphate was added to the tetraethyl ammonium salt of phthalic acid, the sparking voltage was lowered on the contrary, i.e., the sparking voltage was deteriorated as the water was added thereto.

Therefore, the synergistic effect to be derived from the combination between water and an organic phosphorus acid compound such as tetraethyl ammonium monobutylphosphate is particularly effective only when this combination is employed in relative to a quaternary ammonium salt of cyanic acid. Accordingly, it will be seen that if other kind of quaternary ammonium salt, which is different from the quaternary ammonium salt of cyanic acid, such as tetraethyl ammonium salt of 2,6-dihydroxybenzoic acid or tetraethyl ammonium salt of phthalic acid is used together with the combination of water and an organic phosphorus acid compound, it is impossible to attain the effect of stabilizing the sparking voltage in relative to the fluctuation of the water content.

The electrolytic capacitor according to this invention can obtain the following effects.

(1) Since the electrolytic solution (I) is low in specific resistance, it is possible to realize an electrolytic capacitor excellent in high frequency characteristics.

(2) It is known to increase the specific surface area and to enlarge the electrostatic capacity by forming rugged surface on an anode made of an aluminum strip by means of etching for the purpose of minimizing an electrolytic capacitor. However, when a larger number of fine holes are formed on the surface of anode as a result of advancement of fine working, the apparent resistance in a part of an electrolytic solution which is entered into these fine hole is increased. Therefore, the fine working of anode can not effectively put to practical use.

Since the electrolytic solution (I) is low in specific resistance, it is possible to maintain the apparent resistance of an electrolytic solution to a low level even if a large number of fine holes are formed through etching on the surface of the anode. As a result, since the fine working of anode can put to practical use, it is possible to increase the electrostatic capacity. Therefore, it is now possible to minimize the electrolytic capacitor.

(3) Since the electrolytic solution (I) is high and stable in sparking voltage, it is possible to realize an electrolytic capacitor excellent in withstand voltage characteristics.

(4) Since the electrolytic solution (I) is chemically stable, it is possible to improve the reliability in storage stability and the like of an electrolytic capacitor.

Therefore, being provided with an electrolytic solution having a composition as mentioned above, an electrolytic capacitor excellent in performance and reliability can be realized.

Electrolytic Solution (II)

This electrolytic solution comprises a quaternary ammonium salt of aliphatic oxyacid, at least one compound selected from an organic phosphine compound and a surfactant, and an organic solvent.

Examples of the aliphatic oxyacid are hydroxyacetic acid, lactic acid, malic acid, tartaric acid and citric acid. Examples of quaternary ammonium salt for constituting the quaternary ammonium salt of oxyacid are tetramethyl ammonium, tetraethyl ammonium, tetrapropyl ammonium, tetrabutyl ammonium, methyltriethyl ammonium, dimethyldiethyl ammonium, trimethylethyl ammonium, methyltripropyl ammonium, dimethyldipropyl ammonium, trimethylpropyl ammonium, dimethyldibuty ammonium, trimethylbutyl ammonium, triethylpropyl ammonium, triethylbutyl ammonium, phenyltrimethyl ammonium, cyclohexyltrimethyl ammonium, benzyltrimethyl ammonium, N,N-dimethylpyrrolidinium, N,N-dimethylpiperazinium and N-ethylpyridinium. In particular, the quatenary ammonium of hydroxyacetic acid is availably used because of decreasing the specific resistance of an electrolytic solution.

These quaternary ammonium salts of oxyacid may be added to an organic solvent until the solvent is saturated with any of these quaternary ammonium salts of cyanic acid.

As for the organic phosphine compound, an organic phosphine or derivatives thereof may be employed. Examples of organic phosphine are triphenyl phosphine, tritolyl phosphine, hydroxyphenyldiphenyl phosphine, methyldiphenyl phosphine, triethyl phosphine, tributyl phosphine, diphenyl phosphine and phenyl phosphine. Examples of phosphine derivatives are triphenyl phosphine oxide, triphenyl phosphine sulfide, triphenyl phosphine selenide, trimethyl phosphine oxide, methyldiphenyl phosphine oxide, diphenyl phosphine oxide and phenyl phosphine oxide.

As for the surfactant, any of nonionic, anionic, cationic or amphoteric surfactant can be employed as long as they are capable of being dissolved in an organic solvent mentioned above. However, it may be advisable to avoid a surfactant which may impair the characteristics of the capacitor, such as those containing a halogen ion.

Examples of surfactant useful in this invention are fluorine-based surfactants, silicone-based surfactants and hydrocarbon-based surfactants. These surfactants are formed of basically the same structure comprising a hydrophilic portion and a hydrophobic portion. These surfactants are classified into fluorine-based surfactants, silicone-based surfactants and etc., depending on the kind of radical such as fluorine or silicone attached to the hydrophobic portion. Specific examples of such surfactants are nonion-based fluorination alkyl ester, polyoxyethylene denatured silicone, nonion-based alkyl ether and nonion-based alkyl ester.

At least one compound selected from organic phosphine compounds and surfactants may be added to the electrolytic solution at the ratio of preferably 0.01 to 20% by weight. If the content of the compound is less than 0.01% by weight based on the weight of the electrolytic solution, the effect of improving the sparking voltage would become negligible. On the other hand, if the content of the compound exceeds 20% by weight based on the weight of the electrolytic solution, the quaternary ammonium salt of oxyacid can not be fully dissolved into the organic solvent so that the specific resistance of the electrolytic solution may be caused to increase. More preferable content of the compound is 0.1 to 5% by weight.

Examples of the organic solvent useful in this invention are lactonic solvents such as γ-butyrolactone, α-acetylbutyrolactone, β-butyrolactone, γ-valerolactone and δ-valerolactone; amic solvents such as N-methyl formamide, N,N-dimethyl formamide, N-ethyl formamide, N,N-diethyl formamide, N-methyl acetamide, N,N-dimethyl acetamide, N,N-dimethyl propionamide and hexamethyl phosphorylamide; carbonate solvents such as ethylene carbonate, propylene carbonate, butylene carbonate, dimethyl carbonate, diethyl carbonate, and methylethyl carbonate; nitrile solvents such as acetnitrile and propionitrile; phosphate solvents such as trimethyl phosphate; alcoholic solvents such as ethylene glycol and methyl Cellosolve; N-methylpyrrolidinone; N-methyl-2-oxazolydinone; dimethyl sulfoxide; sulforane and 1,3-dimethyl-2-imidazolydinone. These solvents may be employed singly or in combination of them.

This electrolytic solution may contain at least one phosphorus compound selected from an organic phosphorus acid compound, phosphoric acid and salts thereof. The content of the phosphorus compound should preferably be in the range of 0.01 to 10 wt % based on the total weight of the electrolytic solution.

Further, this electrolytic solution may contain water, preferably in the range of 0.01 to 10 wt % based on the total weight of the electrolytic solution.

Being composed of a quaternary ammonium salt of aliphatic oxyacid and at least one compound selected from an organic phosphine compound and a surfactant, all of which being dissolved in an organic solvent, the electrolytic solution (II) explained above can be made low in specific resistance, high in sparking voltage for example 150 V or more, effectively inhibiting spark from the interface between the electrolytic solution and air, and stable in sparking voltage.

The electrolytic capacitor according to another embodiment of this invention can obtain the following effects.

(1) Since the electrolytic solution (II) is low in specific resistance, it is possible to realize an electrolytic capacitor excellent in high frequency characteristics.

(2) It is know to increase the specific surface area and to enlarge the electrostatic capacity by forming rugged surface on an anode made of an aluminum strip by means of etching for the purpose of minimizing an electrolytic capacitor. However, when a larger number of fine holes are formed on the surface of anode as a result of advancement of fine working, the apparent resistance in a part of an electrolytic solution which is entered into these fine hole is increased. Therefore, the fine working of anode can not effectively put to practical used.

Since the electrolytic solution (II) is low in specific resistance, it is possible to maintain the apparent resistance of an electrolytic solution to a low level even if a large number of fine holes are formed through etching on the surface of the anode. As a result, since the fine working of anode can put to practical use, it is possible to increase the electrostatic capacity. Therefore, it is now possible to minimize the electrolytic capacitor.

(3) Since the electrolytic solution (II) is high and stable in sparking voltage, it is possible to realize an electrolytic capacitor excellent in withstand voltage characteristics.

(4) Since the electrolytic solution (II) is chemically stable, it is possible to improve the reliability in storage stability and the like of an electrolytic capacitor.

Therefore, being provided with an electrolytic solution (II) having a composition as mentioned above, an electrolytic capacitor excellent in performance and reliability can be realized.

The present invention will be described in greater detail below by way of its preferred examples. (Examples 1 to 8; Comparative Examples 1 to 7)

Fifteen different kinds of electrolytic solutions for electrolytic capacitor having the compositions shown Table 1 were prepared.

These electrolytic solutions thus prepared were measured of their specific resistance and sparking voltage, the results being also shown in Table 1. In the measurement of the sparking voltage, an anode made of pure aluminum foil having no oxide film deposited thereon was immersed into an electrolytic solution, and a constant current was applied to the anode. The measurement of the sparking voltage was carried out by using a constant current until the voltage reaches to 150 V, and after the voltage was over 150 V, by using a constant voltage. Therefore, with respect to the electrolytic solutions having the sparking voltage over 150 V, the value of the current at the sparking voltage of 150 V is also shown in the Table 1.

TABLE 1

| | Electrolytic Solution | | Specific resistance | Sparking voltage |
|---|---|---|---|---|
| | Composition | Content (wt %) | 25° C. (Ω cm) | (V) |
| Example 1 | Tetraethyl ammonium cyanate | 20 | 63 | 150 or more |
| | Tetramethyl ammonium monobutyl phosphonate | 0.5 | | (Current; |
| | Water | 3 | | 1/100 or less) |
| | γ-butyrolactone | 76.5 | | |
| Example 2 | Tetraethyl ammonium cyanate | 20 | 63 | 150 or more |
| | Tetramethyl ammonium monobutyl phosphate | 1 | | (Current; |
| | Water | 2 | | 1/100 or less) |
| | γ-butyrolactone | 77 | | |
| Example 3 | Tetraethyl ammonium cyanate | 20 | 62 | 150 or more |
| | Tetraethyl ammonium dimethyl phosphate | 1 | | (Current; |
| | Water | 5 | | 1/100 or less) |
| | γ-butyrolactone | 74 | | |
| Example 4 | Tetraethyl ammonium cyanate | 20 | 63 | 150 or more |
| | Tetraethyl ammonium phenyl phosphate, monobasic | 1 | | (Current; 1/100 or less) |
| | Water | 3 | | |
| | γ-butyrolactone | 76 | | |
| Example 5 | Tetraethyl ammonium cyanate | 20 | 63 | 150 or more |
| | Tetramethyl ammonium monobutyl phosphate | 1 | | (Current; |
| | Water | 3 | | 1/50 or less) |
| | γ-butyrolactone | 76 | | |
| Example 6 | Tetraethyl ammonium cyanate | 20 | 63 | 150 or more |
| | Phosphoric acid | 0.5 | | (Current; |
| | Water | 3 | | 1/50 or less) |
| | γ-butyrolactone | 76.5 | | |
| Example 7 | Tetraethyl ammonium cyanate | 20 | 63 | 150 or more |
| | Tetrabutyl ammonium phosphate | 1 | | (Current; |
| | Water | 3 | | 1/50 or less) |
| | γ-butyrolactone | 76 | | |
| Example 8 | Tetraethyl ammonium cyanate | 20 | 59 | 150 or more |
| | Phenyl phosphine | 1 | | (Current; |
| | Water | 3 | | 1/50 or less) |
| | Dimethyl sulfoxide | 26 | | |
| | γ-butyrolactone | 50 | | |
| Comparative Example 1 | Tetraethyl ammonium cyanate | 20 | 63 | 70 |
| | γ-butyrolactone | 80 | | |
| Comparative Example 2 | Tetraethyl ammonium cyanate | 20 | 63 | 95 |
| | Water | 3 | | |
| | γ-butyrolactone | 77 | | |
| Comparative Example 3 | Tetraethyl ammonium cyanate | 20 | 63 | 70 |
| | Tetramethyl ammonium monobutyl phosphate | 1 | | |
| | γ-butyrolactone | 79 | | |
| Comparative Example 4 | Tetraethyl ammonium cyanate | 20 | 63 | 70 |
| | Trimethyl phosphate | 1 | | |
| | Water | 3 | | |
| | γ-butyrolactone | 76 | | |
| Comparative Example 5 | Tetraethyl ammonium 2,6-dihydroxybenzate | 20 | 82 | 5 |
| | Tetramethyl ammonium monobutyl phosphate | 1 | | |
| | Water | 3 | | |
| | γ-butyrolactone | 76 | | |
| Comparative Example 6 | Tetramethyl ammonium phthalate | 20 | 100 | 65 |
| | Tetramethyl ammonium monobutyl phosphate | 1 | | |
| | Water | 3 | | |
| | γ-butyrolactone | 76 | | |
| Comparative Example 7 | Tetramethyl ammonium phthalate | 20 | 100 | 60 |
| | Monomethyl phosphate | 1 | | |
| | Water | 3 | | |
| | γ-butyrolactone | 76 | | |

As apparent from Table 1, the electrolytic solutions of Examples 1 to 8 are low in specific resistance, high in sparking voltage and stable in sparking voltage. Further, in the case of Examples 1 to 8, when the sparking voltage was increased to 150 V, almost no current flow was admitted, thus indicating the formation of an oxide film on the aluminum foil anode, which was high in withstand voltage (insulation properties) and excellent in stability. By contrast, the electrolytic solutions of Comparative Examples 1 to 7 were low and unstable in sparking voltage. Consequently, it was confirmed through the measurements of sparking voltage that only an oxide film which was low in withstand voltage (insulation properties) and poor in stability was formed on the surface of anode made of an aluminum strip in the case of Comparative Examples 1 to 7.

(Examples 9 to 16)

An etching treatment was applied to an aluminum strip having a thickness of 80 μm, thereby forming a rugged surface on the aluminum strip. Subsequently, the resultant aluminum strip was subjected to an anodic oxidation treatment to form an oxide film on the surface of the aluminum strip, thereby forming an anode.

On this anode were superimposed a separator paper sheet made of Manila paper having a thickness of 50 μm, a cathode plate made of an aluminum strip having a thickness of 80 μm and another separator paper sheet made of Manila paper having a thickness of 50 μm in the mentioned order, thereby forming a laminate, which was then rolled up in such a manner that the latter separator paper sheet was disposed at the outermost side. Then, each of the electrolytic solutions having the same composition as prepared in Examples 1 to 8 was respectively poured into the separators of each of samples, thereby assembling 8 different kinds of electrolytic capacitors, each having a capacity of 100 μF as shown in FIG. 1 and impregnated respectively with one of the electrolytic solutions of Examples 1 to 8.

In each of Examples 9 to 16, 10 pieces of electrolytic capacitors were prepared as a sample. Then, these electrolytic capacitors were subjected to a 5,000 hour-high temperature loading test at a temperature of 105° C. As a result, in all of the test samples, the fluctuation amplitude of generation of sparking at the interface, the results being also shown in Table 2. The measurement of the sparking voltage was performed in the same manner as in the case of Example 1. The measurement of the sparking voltage was carried out by using a constant current until the voltage reaches to 150 V, and after the voltage was over 150 V, by using a constant voltage. Therefore, with respect to the electrolytic solutions having the sparking voltage over 150 V, the value of the current at the sparking voltage of 150 V is also shown in Table 2. With respect to the electrolytic solutions having the sparking voltage of less than 150 V, the oscillation of voltage (fluctuation in voltage) are also shown in Table 2. The range of values, "125 to 80" shown in Comparative Example 8 for example indicates that the sparking voltage fluctuated vigorously within the range of 125 V to 80 V.

TABLE 2

| | Electrolytic Solution | | Specific resistance 25° C. (Ω cm) | Sparking voltage (V) | Generation of sparking at interface |
|---|---|---|---|---|---|
| | Composition | Content (wt %) | | | |
| Example 17 | Tetraethyl ammonium hydroxyacetate | 20 | 71 | 150 or more (Current 1/50 or less | No |
| | Triphenyl phosphine | 1 | | | |
| | γ-butyrolactone | 79 | | | |
| Example 18 | Tetraethyl ammonium hydroxyacetate | 20 | 73 | 150 or more (Current 1/50 or less | No |
| | Triphenyl phosphine | 5 | | | |
| | γ-butyrolactone | 75 | | | |
| Example 19 | Tetraethyl ammonium hydroxyacetate | 20 | 72 | 150 or more (Current 1/50 or less | No |
| | Triphenyl phosphine | 3 | | | |
| | γ-butyrolactone | 77 | | | |
| Example 20 | Tetraethyl ammonium hydroxyacetate | 20 | 71 | 150 or more (Current 1/100 or less | No |
| | Surfactant (nonion-based fluorination alkyl ester) | 0.5 | | | |
| | γ-butyrolactone | 79.5 | | | |
| Example 21 | Tetraethyl ammonium hydroxyacetate | 20 | 71 | 150 or more (Current; 1/100 or less) | No |
| | Surfactant (polyoxyethylene denatured silicone) | 1 | | | |
| | γ-butyrolactone | 79 | | | |
| Example 22 | Triethyl ammonium hydroxyacetate | 20 | 68 | 150 or more (Current; 1/100 or less) | No |
| | Surfactant (nonion-based alkyl ether) | 1 | | | |
| | γ-butyrolactone | 54 | | | |
| | Dimethyl sulfoxide | 25 | | | |
| Comparative Example 8 | Tetraethyl ammonium hydroxyacetate | 20 | 71 | 125 (Voltage fluctuation; 125 to 80) | Yes |
| | γ-butyrolactone | 80 | | | |
| Comparative Example 9 | Triethyl ammonium hydroxyacetate | 20 | 100 | 125 (Voltage fluctuation; 125 to 75) | Yes |
| | γ-butyrolactone | 80 | | | |
| Comparative Example 10 | Tetraethyl ammonium hydroxyacetate | 20 | 68 | 120 (Voltage fluctuation; 125 to 75) | Yes |
| | γ-butyrolactone | 54 | | | |
| | Dimethyl sulfoxide | 26 | | | | changes of electrostatic capacity and of dielectric dissipation factor with time were limited within the 10% of the initial values, thus indicating an excellent stability. (Examples 17 to 22; Comparative Examples 8 to 10)

Nine different kinds of electrolytic solutions for electrolytic capacitor having the compositions shown Table 2 were prepared. The γ-butyrolactone used herein contained 3% by weight of water and 1% by weight of phosphoric acid.

These electrolytic solutions thus prepared in Examples 17 to 22 and Comparative Examples 8 to 10 were measured as to the specific resistance, the sparking voltage and the As apparent from Table 2, the electrolytic solutions of Examples 17 to 22 are low in specific resistance and high in sparking voltage. Further, in the case of Examples 17 to 22, when the sparking voltage was increased to 150 V, almost no current flow was admitted, thus indicating the formation of an oxide film on the aluminum foil anode, which was high in withstand voltage (insulation properties) and excellent in stability. By contrast, the electrolytic solutions of Comparative Examples 8 to 10 were low and unstable in sparking voltage. Consequently, it was confirmed through the measurements of sparking voltage that only an oxide film which was low in withstand voltage (insulation properties) and poor in stability was formed on the surface of anode made of an aluminum strip in the case of Comparative Examples 8 to 10.

(Examples 23 to 27)

An etching treatment was applied to an aluminum strip having a thickness of 80 µm, thereby forming a rugged surface on the aluminum strip. Subsequently, the resultant aluminum strip was subjected to an anodic oxidation treatment to form an oxide film on the surface of the aluminum strip, thereby forming an anode.

On this anode were superimposed a separator paper sheet made of Manila paper having a thickness of 50 µm, a cathode plate made of an aluminum strip having a thickness of 80 µm and another separator paper sheet made of Manila paper having a in thickness of 50 µm in the mentioned order, thereby forming a laminate, which was then rolled up in such a manner that the latter separator paper sheet was disposed at the outermost side. Then, each of the electrolytic solutions having the same composition as prepared in Examples 17 to 22 was respectively poured into the separators of each of samples, thereby assembling five different kinds of electrolytic capacitors, each having a capacity of 100 µF as shown in FIG. 1 and impregnated respectively with one of the electrolytic solutions of Examples 17 to 22.

In each of Examples 23 to 27, 10 pieces of electrolytic capacitors were prepared as a sample. Then, these electrolytic capacitors were subjected to a 5,000 hour-high temperature loading test at a temperature of 105° C. As a result, in all of the test samples, the fluctuation amplitude of changes of electrostatic capacity and of dielectric dissipation factor with time were limited within the 10% of the initial values, thus indicating an excellent stability.

As explained above, it is possible according to this invention to provide an electrolytic solution for an electrolytic capacitor which is low in specific resistance, high in sparking voltage and stable in sparking property.

Furthermore, it is possible according to another embodiment of this invention to provide an electrolytic capacitor of high performance and high reliability, which is charged with an electrolytic solution having a low specific resistance, a high sparking voltage and a stable sparking property.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An electrolytic solution for an electrolytic capacitor, which comprises a quaternary ammonium salt of cyanic acid, at least one phosphorus compound selected from an organic phosphorus acid compound, phosphoric acid and salts thereof, water, and an organic solvent.

2. An electrolytic solution, which comprises a quaternary ammonium salt of cyanic acid, at least one phosphorus compound selected from an organic phosphorus acid compound, phosphoric acid and salts thereof, water, and an organic solvent, wherein said quaternary ammonium salt of cyanic acid is tetraethyl ammonium cyanate.

3. The electrolytic solution according to claim 2, wherein said organic phosphorus acid compound is monobutylphosphate.

4. The electrolytic solution according to claim 2, wherein said organic phosphorus acid compound is tetramethyl ammonium monobutylphosphate.

5. The electrolytic solution according to claim 2, wherein said organic phosphorus acid compound is tetramethyl ammonium dibutylphosphate.

6. The electrolytic solution according to claim 1, wherein said at least one phosphorus compound selected from an organic phosphorus acid compound, phosphoric acid and salts thereof is added to the electrolytic solution at a ratio of 0.01 to 20% by weight.

7. The electrolytic solution according to claim 1, wherein said water is added to the electrolytic solution at a ratio of 0.05 to 20% by weight.

8. The electrolytic solution according to claim 1, wherein said solvent is γ-butyrolactone.

9. An electrolytic capacitor which comprises an anode made of aluminum foil strip having an oxide film on at least one surface, a cathode plate and a separator paper sheet impregnated with an electrolytic solution,
wherein said electrolytic solution comprises a quaternary ammonium salt of cyanic acid, at least one phosphorus compound selected from an organic phosphorus acid compound, phosphoric acid and salts thereof, water, and an organic solvent.

10. The electrolytic capacitor according to claim 9, wherein said oxide film on the surface of said aluminum foil strip is formed by an anodic oxidation treatment.

11. The electrolytic capacitor according to claim 9, wherein said aluminum foil strip has a fine rugged surface which is formed by way of an etching treatment in advance to the formation of oxide film.

12. The electrolytic capacitor according to claim 9, wherein said cathode plate is made of an aluminum foil strip.

13. An electrolytic capacitor which comprises an anode made of aluminum foil strip having an oxide film on at least one surface, a cathode plate and a separator paper sheet impregnated With an electrolytic solution,
wherein said electrolytic solution comprises a quaternary ammonium salt of cyanic acid, at least one phosphorus compound selected from an organic phosphorous acid compound, phosphoric acid and salts thereof, water, and an organic solvent, wherein said quaternary ammonium salt of cyanic acid in said electrolytic solution is tetraethyl ammonium cyanate.

14. The electrolytic capacitor according to claim 13, wherein said organic phosphorus acid compound in said electrolytic solution is monobutylphosphate.

15. The electrolytic capacitor according to claim 13, wherein said organic phosphorus acid compound in said electrolytic solution is tetramethyl ammonium monobutylphosphate.

16. The electrolytic capacitor according to claim 13, wherein said organic phosphorus acid compound in said electrolytic solution is tetramethyl ammonium dibutylphosphate.

17. The electrolytic capacitor according to claim 9, wherein said at least one phosphorus compound selected from an organic phosphorus acid compound, phosphoric acid and salts thereof is added to the electrolytic solution at a ratio of 0.01 to 20% by weight.

18. The electrolytic capacitor according to claim 9, wherein said water is added to the electrolytic solution at a ratio of 0.05 to 20% by weight.

19. The electrolytic capacitor according to claim 9, wherein said solvent in said electrolytic solution is γ-butyrolactone.

20. An electrolytic solution for an electrolytic capacitor, which comprises a quaternary ammonium salt of aliphatic oxyacid, at least one compound selected from an organic phosphine compound and a surfactant, and an organic solvent.

21. The electrolytic solution according to claim 20, wherein said quaternary ammonium salt of aliphatic oxyacid is tetraethyl ammonium hydroxyacetate.

22. The electrolytic solution according to claim 20, wherein said organic phosphine compound is triphenyl phosphine.

23. The electrolytic solution according to claim 20, wherein said at least one compound selected from an organic phosphine compound and surfactant are added to the electrolytic solution at a ratio of 0.01 to 20% by weight.

24. The electrolytic solution according to claim 20, wherein said solvent is γ-butyrolactone.

25. An electrolytic capacitor which comprises an anode made of aluminum foil strip having an oxide film on at least one surface, a cathode plate and a separator paper sheet impregnated with an electrolytic solution,
wherein said electrolytic solution comprises quaternary ammonium salt of aliphatic oxyacid, at least one compound selected from an organic phosphine compound and a surfactant, and an organic solvent.

26. The electrolytic capacitor according to claim 25, wherein said oxide film on the surface of said aluminum foil strip is formed by an anodic oxidation treatment.

27. The electrolytic capacitor according to claim 25, wherein said aluminum foil strip has a fine rugged surface which is formed by way of an etching treatment in advance to the formation of oxide film.

28. The electrolytic capacitor according to claim 25, wherein said cathode plate is made of an aluminum foil strip.

29. The electrolytic capacitor according to claim 25, wherein said quaternary ammonium salt of aliphatic oxyacid in said electrolytic solution is tetraethyl ammonium hydroxyacetate.

30. The electrolytic capacitor according to claim 25, wherein said organic phosphine compound in said electrolytic solution is triphenyl phosphine.

31. The electrolytic capacitor according to claim 25, wherein said at least one compound selected from an organic phosphine compound and surfactant are added to the electrolytic solution at a ratio of 0.01 to 20% by weight.

32. The electrolytic solution according to claim 25, wherein said solvent is γ-butyrolactone.

33. The electrolytic solution according to claim 1, wherein said organic phosphorus acid compound is selected from the group consisting of monobutylphosphate, tetramethyl ammonium monobutylphosphate and tetramethyl ammonium dibutylphosphate.

34. The electrolytic capacitor of claim 9, wherein said organic phosphorus acid compound in said electrolytic solution is selected from the group consisting of monobutylphosphate, tetramethyl ammonium monobutylphosphate and tetramethyl ammonium dibutylphosphate.

* * * * *